United States Patent Office 3,549,559
Patented Dec. 22, 1970

3,549,559
CATALYSIS
James W. Abson and Manfred Landau, Cheadle Hulme, Eric I. Clark, Cheadle, and Alan Molyneux, Ashton-on-Mersey, Sale, England, assignors to Simon-Carves Limited, Cheadle Heath, Stockport, England, a British company
No Drawing. Filed Sept. 5, 1967, Ser. No. 668,739
Claims priority, application Great Britain, Sept. 24, 1966, 42,749/66
Int. Cl. B01j *11/22*
U.S. Cl. 252—459                                      6 Claims

ABSTRACT OF THE DISCLOSURE

A method of producing a catalyst comprising the steps of contacting, under aerobic conditions, metal acetate-containing material with an aqueous culture comprising acetate-oxidizing bacteria, removing the culture from the material, and drying the material.

BACKGROUND

This invention is concerned with improvements in or relating to catalysis.

Certain previously proposed methods of activating material to provide catalytic activity have at times proved difficult and inconvenient. For example, thermal methods are often used to prepare catalysts; these methods are at times inconvenient and there is a danger of damage to the material resulting from excessive heating: for example the heating may lead to breakdown of crystal lattice structure thus reducing the specific surface area available for catalysis.

U.S. Letters Pat. No. 3,414,524 issued Dec. 3, 1968 discloses a method of activating material to provide catalytic activity wherein the material is contacted with bacteria. Examples of bacteria given in said complete specification include sulphate-reducing bacteria, sulphide-oxidising bacteria and iron-oxidising bacteria. The present invention includes the discovery that material may be activated to provide catalytic activity by treatment involving acetate-oxydising bacteria.

SUMMARY

We have now found that acetate-oxidising bacteria can be used in a method of producing a catalyst.

Enzymes in certain circumstances have an action which can be regarded as catalytic but the present invention is concerned with catalytically active material the molecular weight of any monomeric unit of which is below enzymatic magnitude, and is not concerned with enzymes.

The invention provides a method of producing a catalyst wherein metal acetate-containing material is contacted with acetate-oxidising bacteria as such are known. For example see Journal of General Physiology, 1951, vol. 34, pp. 785–794.

The invention also provides a method of producing a catalyst comprising the steps of contacting, under aerobic conditions, metal acetate-containing material with an aqueous culture comprising acetate-oxidising bacteria, removing the culture from the material, and drying the material.

The invention also provides a catalyst produced by a method wherein metal acetate-containing material is contacted with acetate-oxidising bacteria.

The invention also provides a catalyst bed comprising a catalyst as set out in the last preceding paragraph.

The invention also provides a catalytic reactor comprising a catalyst bed as set out in the last preceding paragraph.

Examples of metal acetates include the acetates of iron, cobalt, nickel, molybdenum, chromium, tungsten, manganese, magnesium, and zinc.

In the case of nickel acetate the reaction effected is believed to be as follows:

$$(COOH_3)_2 \xrightarrow{O_2} CO_2 + H_2O + Ni(OH)_2$$

Subsequent reduction of the material produces metallic nickel.

It appears that the method is simple to carry out on account of the use of aerobic bacteria, and bacterial growth conditions which are not highly critical: the method also appears to be rapid.

The method can be used in some cases to prepare catalysts involving metals which do not form sulphates. It is believed that heating of the bacterially treated material is not normally necessary beyond the operating temperature of the catalytic process in which it may be used. It appears that the crystal lattice structure of the material contacted with the bacteria is extended by the bacterial treatment in certain cases. Care may be needed to avoid problems of toxicity to the bacteria.

Preferably the aqueous culture comprises a nutrient solution of low acetate concentration, the culture is contacted with the material comprising metal acetate at a temperature between 15° C. and 37° C., more preferably between 20° C. and 37° C., for example about 30° C., the pH of the culture being maintained between 8 and 9 more preferably at 8.5 throughout contacting.

The invention also provides a method of producing a catalyst bed comprising the steps of contacting, under aerobic conditions, material comprising sepiolite, impregnated with nickel acetate, with an aqueous culture comprising acetate-oxidising bacteria at a temperature between 15° C. and 37° C. and a pH between 8 and 9 to oxidise nickel acetate to nickel hydroxide, removing the culture from the material, drying the material, and charging the material into a catalytic reactor to provide the catalyst bed.

Preferably before contacting with the bacterial culture the metal acetate-containing material is first impregnated into a carrier. Examples of carriers which may be used include bauxite, activated alumina, aluminum phosphates, magnesia, silica, silicon carbide, sepiolite, zeolites, bentonite, zirconium phosphate, molecular sieves, firebrick and mixtures and compounds of any of these substances.

Impregnation can be carried out by various methods. In one method, for example, the carrier in powdered form is immersed in a solution of the impregnant; this is followed by boiling under vacuum, filtration or centrifuging, and drying; the resultant powder is then pelletised. In another method, for example, the carrier in powdered form is immersed in a warm solution of the impregnant; this is followed by stirring under atmospheric pressure, filtration or centrifuging, and drying; the resultant powder is then pelletised. Preferably in both these methods impregnation methods contacting with bacteria is carried out after impregnation but before pelletising. In a further method, for example the carrier is immersed in a solution of the impregnant which is then simmered to almost dryness; this is followed by drying.

Care may be needed during impregnation to avoid contamination with bacterial poisons.

A nickel catalyst may be used, for example, as a guard catalyst in reducing the concentration in gases of organic sulphur compounds, unsaturated hydrocarbons and other compounds to minimise the rate of poisoning by said compound of a main catalyst with which the gases are subsequently contacted. For example, the catalyst may be used for this purpose in the detoxification of fuel gas by the "shift" reaction ($CO+H_2O \rightarrow CO_2+H_2$), reforming and the hydrogenation of unsaturated compounds.

Examples of chemical reactions in which a nickel catalyst may be used as a main catalyst include dehydrogenation, defluorination, desulphurisation, hydrogenation, hydrogenolysis, polymerisation, reforming, methanation and oxidation of hydrocarbons.

Where a catalyst as described hereinabove is fouled by the formation of metal sulphate, sulphate-reducing bacteria may be used for regeneration as described in said Pat. No. 3,414,524.

EXAMPLE I

| Nutrient solution | Gm./litre |
|---|---|
| $NH_4NO_3$ | 0.22 |
| $K_2HPO_4$ | 0.07 |
| $FeCl_3$ | 0.01 |
| NaCl | 0.10 |
| $MgSO_4$ | 0.20 |
| pH 9 | |

Sepiolite powder was dried at 185° C. for about two days. The powder was then immersed in a solution of nickel acetate at 75° C. and stirred at that temperature for about 2 hours. The powder was then filtered and dried.

A 10% inoculum of acetate oxidising bacteria, which had been prepared from sewage by standard enrichment techniques, was added to the nutrient solution which was at a temperature of 30° C. and the dried powder was immersed in the resultant aqueous culture. The culture was then aerated in a stirred tank reactor at 30° C. for about 5 days, when no acetate remained either on the powder or in the culture. The culture was then centrifuged to remove the powder which was then dried at 100° C. and pelletised to produce pellets ¼" diameter x ¼" axial length. The pellets contained 3.6% by weight Ni, apparently in the form of a mixture of nickel oxide and nickel hydroxide. The specific surface area determined by nitrogen adsorption was 283 m.²/gm.

These catalyst pelets were charged into a reactor to provide a fixed bed of catalyst which was used as a guard catalyst in the shift reaction. Town gas mixed with 20% steam by volume of the mixture and containing acetylene and organic sulphur compounds was contacted with the guard catalyst and then with a conventional main catalyst for the shift reaction, at an average guard catalyst temperature of 370° C. and an average space velocity over the guard catalyst of 1000 volumes of gas per unit catalyst volume per hour. After about three months continuous operation 100% acetylene conversion and 84.3% organic sulphur conversion were being obtained over the guard catalyst.

EXAMPLE II

| Nutrient solution | Gm./litre |
|---|---|
| $NaCOOCH_3$ | 6 |
| $NH_4NO_3$ | 0.22 |
| NaCl | 0.1 |
| $FeCl_3$ | 0.01 |
| $K_2HPO_4$ | 0.07 |
| $MgSO_4$ | 0.2 |

Sepiolite powder was dried at 185° C. The powder was then immersed in a solution of nickel acetate (3% by weight Ni) and stirred at 20° C. for about 24 hours. The solution was then centrifuged to remove the powder.

A 20% inoculum of a stock culture comprising acetate-oxidising baceteria was added to the nutrient solution and the solution was aerated for about four days at 20° C. when no acetate remained in the solution; the stock culture had been prepared from sewage by standard enrichment techniques. The impregnated sepiolite powder was then immersed in the resultant aqueous culture. The culture was then aerated in a stirred tank reactor at 20° C. for about 3 days, when no acetate remained either on the powder or in the culture, the pH was maintained at about 8 by appropriate additions of soium hydroxide. The culture was then centrifuged to remove the powder which was dried at 180° C. and extruded to produce pellets ¼" diameter x ½" axial length. The pellets contained 3.35% Ni apparently in the form of a mixture of nickel oxide and nickel hydroxide. The specific surface area was 130 m.²/gm.

These catalyst pellets were charged into a reactor to provide a fixed bed of catalyst which was used as a guard catalyst in the shift reaction. Town gas mixed with 25% steam by volume of the mixture and containing acetylene and organic sulphur compounds was contacted with the guard catalyst and then with a conventional main catalyst for the shift reaction; the average guard catalyst temperature was 320° C. the average space velocity over the guard catalyst was 1600 volumes of gas per unit catalyst volume per hour, and the average main catalyst temperature was 450° C. After about one month's operation 89% conversion of carbon monoxide was being achieved over the main catalyst, indicating a high efficiency of the guard catalyst.

EXAMPLE III 50 grams of a powdered alumina catalyst support (93% by weight $Al_2O_3$) having a specific surface area of 98.4 m.²/gm. was immersed in 250 ml. of a nickel acetate (3% Ni) solution and simmersed to almost dryness. Excess nickel acetate was removed by light washing with distilled water. The impregnated support was then dried and 20 grams of it was immersed in 1 litre of the aqueous acetate culture described in Example I. The pH value was adjusted to 7.5. After two weeks aeration the pH had increased to 10 and the support was then washed lightly to remove bacterial slime and analysed.

Before bacterial treatment the impregnated support contained 10.42% by weight Ni and 10.36% acetate. After the bacterial treatment the support contained 9.73% Ni and 1.06% acetate; the specific surface area was now 82.5 m.²/gm.

The treated support was then reduced in a stream of hydrogen at 350° C. The reduced material showed activity for the methanation reaction $CO+3H_2 \rightarrow CH_4+H_2O$.

EXAMPLE IV

The procedure of Example III was substantially repeated with an alumina/silica support in the form of spheres having a specific surface area of 86.6 m.²/gm.

After impregnation of nickel content was 8.17% and the acetate content 9.3%. After bacterial treatment the nickel content was 6.52%, the acetate content 0.7% and the speciffic surface area 98.2 m.²/gm.

Again the reduced material showed excellent activity for the methanation reaction.

EXAMPLE V

The procedure of Example III was substantially repeated with a spinel support in the form of pellets having a surface area of 2.4 m.²/gm.

The nickel content after impregnation was 6.2% and the acetate content 10.04%. After bacterial treatment the nickel content was 4.57% the acetate content 0.47% and the specific surface area 9.8 m.²/gm. Again the catalyst material showed activity for the methanation reaction.

EXAMPLE VI

A powdered kieselguhr catalyst support having a surface area of 30 m.²/gm. was dried at 120° C. and then immersed in nickel acetate (3% Ni.) and evaporated to almost dryness; the support was then dried at 120° C.; the support then contained 11.4% nickel and 15.7% acetate. 10 grams of the impregnated support was stirred and aerated in 500 ml. of the aqueous acetate culture described in Example I for four days after which the support was filtered off and dried. The support then contained 11.2% nickel and 1.5% acetate and the surface area available for catalysis was then 24.2 m.²/gm. When reduced the catalyst showed activity for the hydrogenation of fats.

EXAMPLE VII

The procedure of Example VI was substantially repeated with a highly porous silica gel catalyst support having a specific surface area of 350 m.²/gm. After impregnation the nickel content was 10.6% and the acetate content 14%. After bacterial treatment the nickel content was 11% and the acetate content less than 0.7%, and the specific surface area was then 178.2 m.²/gm. Again when reduced the catalyst showed activity for the hydrogenation of fats.

EXAMPLE VIII

The procedure of Example VI was substantially repeated with a non-porous silica gel catalyst support having a specific surface area of 118 m.²/gm. The nickel content after impregnation was 10.2% and the acetate content 13.2%. After bacterial treatment the nickel content was 10.7%, the acetate content less than 0.7%, and the specific surface area was 228.1 m.²/gm. Again when reduced the catalyst showed activity for the hydrogenation of fats.

We claim:

1. A method for producing a catalyst from a precursor composition comprising a carrier impregnated with a metal acetate, the improvement which comprises contacting said impregnated carrier with an aqueous culture of acetate-oxidizing bacteria under aerobic conditions, at a temperature between 15° C. to 37° C., and at a pH between 8 and 9, and removing the culture from the oxidized composition.

2. A method according to claim 1, comprising the subsequent step of reducing the material.

3. A method according to claim 1 wherein the metal acetate-containing material comprises nickel acetate.

4. A method according to claim 1 wherein the carrier comprises sepiolite.

5. A method of producing a catalyst bed comprising the steps of contacting, under aerobic conditions, material comprising sepiolite, impregnated with nickel acetate, with an aqueous culture comprising acetate oxidising bacteria at a temperature between 15° C. and 37° C. and a pH between 8 and 9 to oxidise nickel acetate to nickel hydroxide, removing the culture from the material, drying the material, and changing the material into a catalytic reactor to provide the catalyst bed.

6. A method according to claim 5 wherein said temperature is between 20° C. and 37° C.

References Cited

UNITED STATES PATENTS

| | | | |
|---|---|---|---|
| 3,272,621 | 9/1966 | Zajic | 75—101 |
| 2,829,964 | 4/1958 | Zimmerley | 75—104 |
| 3,414,524 | 12/1968 | Abson | 252—410 |
| 3,347,661 | 10/1967 | Mayling | 75—104 |
| 3,305,353 | 2/1967 | Duncan et al. | 75—101 |

FOREIGN PATENTS 899,652  6/1962  England.

DANIEL E. WYMAN, Primary Examiner

P. M. FRENCH, Assistant Examiner

U.S. Cl. X.R.

52—466

UNITED STATES PATENT OFFICE
CERTIFICATE OF CORRECTION

Patent No. 3,549,559          Dated December 22, 1970

Inventor(s) James W. Abson et al.

It is certified that error appears in the above-identified patent and that said Letters Patent are hereby corrected as shown below:

Column 1, line 57, should read -- tacted with acetate-oxidising bacteria. Acetate oxidising bacteria as such are known. --. Column 2, line 6, "$(COOH_3)2$" should read -- $(COOCH_3)_2$ --.

Signed and sealed this 20th day of April 1971.

(SEAL)
Attest:

EDWARD M. FLETCHER, JR.          WILLIAM E. SCHUYLER, JR.
Attesting Officer                Commissioner of Patents

UNITED STATES PATENT OFFICE
CERTIFICATE OF CORRECTION

Patent No. 3,549,559      Dated December 22, 1970

Inventor(s)  James W. Abson et al.

It is certified that error appears in the above-identified patent and that said Letters Patent are hereby corrected as shown below:

Column 1, line 57, should read -- tacted with acetate-oxidising bacteria. Acetate oxidising bacteria as such are known. --. Column 2, line 6, "$(COOH_3)_2$" should read -- $Ni(COOCH_3)_2$ --.

This certificate supersedes Certificate of Correction issued April 20, 1971.

Signed and sealed this 20th day of July 1971.

(SEAL)
Attest:

EDWARD M. FLETCHER, JR.
Attesting Officer

WILLIAM E. SCHUYLER,
Commissioner of Patent